United States Patent
Morini et al.

(10) Patent No.: US 10,503,852 B2
(45) Date of Patent: Dec. 10, 2019

(54) FORMAL VERIFICATION OF INTEGRATED CIRCUIT HARDWARE DESIGNS TO IMPLEMENT INTEGER DIVISION

(71) Applicant: Imagination Technologies Limited, Kings Langley (GB)

(72) Inventors: Emiliano Morini, Watford (GB); Sam Elliott, London (GB)

(73) Assignee: Imagination Technologies Limited, Kings Langley (GB)

( * ) Notice: Subject to any disclaimer, the term of this patent is extended or adjusted under 35 U.S.C. 154(b) by 136 days.

(21) Appl. No.: 15/875,176

(22) Filed: Jan. 19, 2018

(65) Prior Publication Data

US 2018/0203953 A1    Jul. 19, 2018

(30) Foreign Application Priority Data

Jan. 19, 2017    (GB) .................................. 1700919.2

(51) Int. Cl.
    *G06F 17/50*    (2006.01)

(52) U.S. Cl.
    CPC ........ *G06F 17/504* (2013.01); *G06F 17/5045* (2013.01); *G06F 2217/02* (2013.01)

(58) Field of Classification Search
    USPC ................................. 716/102, 104, 106, 108
    See application file for complete search history.

(56) References Cited

U.S. PATENT DOCUMENTS

| | | | | |
|---|---|---|---|---|
| 5,754,454 | A * | 5/1998 | Pixley ................. | G06F 17/504 702/123 |
| 6,446,243 | B1 * | 9/2002 | Huang ................ | G06F 17/5022 716/106 |
| 7,216,316 | B1 | 5/2007 | Sutherland et al. | |
| 8,166,430 | B2 * | 4/2012 | Bormann ............ | G06F 17/5081 703/16 |

(Continued)

OTHER PUBLICATIONS

Rager et al., "Formal Verification of Division and Square Root Implementations," Oracle Report, Formal Methods in Computer-Aided Design (FMCAD), Section VI, "Algorithm Verification," Oct. 2016.

*Primary Examiner* — Brian Ngo
(74) *Attorney, Agent, or Firm* — Vorys, Sater, Seymour and Pease LLP; Vincent M. DeLuca

(57) ABSTRACT

Computer-implemented methods of verifying an integrated circuit hardware design to implement an integer divider wherein the integer divider is configured to receive a numerator N and a denominator D and output a quotient q and a remainder r. The method includes (a) verifying a base property is true for the integrated circuit hardware design and (b) formally verifying that one or more range reduction properties are true for the integrated circuit hardware design. The base property is configured to verify that an instantiation of the integrated circuit hardware design will generate a correct output pair q, r in response to any input pair N, D in a subset of non-negative input pairs. The one or more range reduction properties are configured to verify that if an instantiation of the integrated circuit hardware design will generate an output pair q, r in response to a non-negative input pair N, D then an instantiation of the integrated circuit hardware design to implement the integer divider will generate an output pair q', r' that has a predetermined relationship with q and r in response to another non-negative input pair N', D' where N and N' have one of one or more predetermined relationships.

20 Claims, 8 Drawing Sheets

(56) References Cited

U.S. PATENT DOCUMENTS

| | | | |
|---|---|---|---|
| 8,201,125 B1* | 6/2012 | Jang | G06F 17/5054 |
| | | | 716/104 |
| 9,529,947 B1* | 12/2016 | Chiu | G06F 17/5031 |
| 2004/0031002 A1 | 2/2004 | Du et al. | |
| 2008/0028347 A1* | 1/2008 | Hiraoglu | G06F 17/504 |
| | | | 716/103 |
| 2009/0204932 A1* | 8/2009 | Bormann | G06F 17/504 |
| | | | 716/106 |

* cited by examiner

| $n_{k+1}$ | $n_k$ | ... | $n_0$ |

$$-n_{k+1}*2^{k+1} + n_k*2^k + n_{k-1}*2^{k-1} \ldots\ldots + n_0 2^0$$

FIG. 4

FORMAL VERIFICATION OF INTEGRATED CIRCUIT HARDWARE DESIGNS TO IMPLEMENT INTEGER DIVISION

BACKGROUND

With reference to FIG. 1, an integrated circuit to implement integer division 100 (which may be referred to herein as an integer divider) receives as inputs a numerator N and a denominator D, performs (via hardware logic) the operation N divided by D $$\left(i.e. \ \frac{N}{D}\right),$$

and outputs the quotient q and the remainder r of the operation, wherein N=D*q+r, |r|<|D|, and N, D, q and r are integers. As is known to those of skill in the art, when the numerator N and the denominator D are both positive, the quotient q is the number of times the denominator D may be subtracted from the numerator N before the result of the subtraction is negative; and the remainder r is the amount left over after subtracting the denominator D the quotient q number of times from the numerator N. For example, if the numerator N is 26 and the denominator D is 11 then the quotient q of the operation $$\frac{N}{D} = \frac{26}{11}$$

is 2, and the remainder r is 4.

To generate an integrated circuit to implement integer division 100 an integrated circuit hardware design is generated which describes the structure and function of an integrated circuit to implement integer division. The integrated circuit hardware design is then tested, or verified, to ensure that an integrated circuit manufactured in accordance with the integrated circuit hardware design will behave as expected. Once the integrated circuit hardware design has been verified the integrated circuit hardware design is processed at an integrated circuit manufacturing system to generate an integrated circuit in accordance with the integrated circuit hardware design.

An integrated circuit hardware design may be verified, for example, by formal verification or simulation-based verification. Formal verification is a systematic process that uses a mathematical model of the integrated circuited design and mathematical reasoning to verify an integrated circuit hardware design. In contrast, simulation-based verification is a process in which an integrated circuit hardware design is tested by applying stimuli to an instantiation of the integrated circuit hardware design and monitoring the output of the instantiation of the integrated circuit hardware design in response to the stimuli.

Formal verification can improve controllability as compared to simulation based verification. Low controllability occurs when the number of simulation test signals or vectors required to thoroughly simulate a hardware design becomes unmanageable. For example, a 32-bit comparator requires $2^{64}$ test vectors (e.g. stimulus). This would take millions of years to verify exhaustively by simulation based verification. By performing formal verification, the 32-bit comparator can be verified in less than a minute.

While formal verification can provide advantages over simulation-based verification, integrated circuit hardware designs to implement integer division have been difficult to verify using formal verification.

The embodiments described below are provided by way of example only and are not limiting of implementations which solve any or all of the disadvantages of known methods and systems for verifying an integrated circuit hardware design to implement integer division.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are methods of verifying an integrated circuit hardware design to implement an integer divider wherein the integer divider is configured to receive a numerator N and a denominator D and output a quotient q and a remainder r. The method includes (a) verifying that a base property is true for the integrated circuit hardware design; and (b) formally verifying that one or more range reduction properties are true for the integrated circuit hardware design. The base property is configured to verify that an instantiation of the integrated circuit hardware design to implement an integer divider will generate a correct output pair q, r in response to any input pair N, D in a subset of non-negative input pairs. The one or more range reduction properties are configured to verify that if an instantiation of the integrated circuit hardware design to implement an integer divider will generate an output pair q, r in response to a non-negative input pair N, D that an instantiation of the hardware design to implement an integer divider will generate an output pair q', r' that has a predetermined relationship with q and r in response to an input pair N', D when N and N' have one of one or more predetermined relationships.

The base property and the one or more range reduction properties are configured so that verifying the base property and the one or more range reduction properties exhaustively verifies the operation of the integrated circuit hardware design to implement integer division over the non-negative inputs (i.e. N≥0, D>0). Where the integrated circuit hardware design is configured to process negative inputs (i.e. N<0 and/or D<0) the methods may further comprise formally verifying one or more sign relation properties to verify that the integrated circuit hardware design correctly implements integer division over the negative inputs (i.e. N<0 and/or D<0).

A first aspect provides a computer-implemented method of verifying an integrated circuit hardware design to implement an integer divider, the integer divider configured to receive a numerator N and a denominator D and output a quotient q and a remainder r, the method comprising, in one or more processors: verifying that a base property is true for the integrated circuit hardware design, the base property configured to verify that an instantiation of the integrated circuit hardware design will generate a correct output pair q, r in response to any input pair N, D in a subset of non-negative input pairs; formally verifying, by a formal verification tool, that one or more range reduction properties are true for the integrated circuit hardware design, the one or more range reduction properties configured to verify that if an instantiation of the integrated circuit hardware design will generate an output pair q, r in response to a non-negative input pair N, D then an instantiation of the integrated circuit hardware design will generate an output pair q', r' that has a predetermined relationship with q and r in response to another non-negative input pair N', D where N and N' have one of one or more predetermined relationships; and outputting one or more signals indicating whether the properties have been successfully verified.

A second aspect provides a system to verify an integrated circuit hardware design to implement an integer divider, the integer divider configured to receive a numerator N and a denominator D and output a quotient q and a remainder r, the system comprising: one or more processors; and memory, comprising: a formal verification tool; computer-readable instructions that when executed by the one or more processors cause the one or more processors to: verify that a base property is true for the integrated circuit hardware design, the base property configured to verify that an instantiation of the integrated circuit hardware design will generate a correct output pair q, r in response to any input pair N, D in a subset of non-negative input pairs; formally verify, by the formal verification tool, that one or more range reduction properties are true for the integrated circuit hardware design, the one or more range reduction properties configured to verify that if an instantiation of the integrated circuit hardware design will generate an output pair q, r in response to a non-negative input pair N, D then an instantiation of the integrated circuit hardware design will generate an output pair q', r' that has a predetermined relationship with q and r in response to another non-negative input pair N', D where N and N' have one of one or more predetermined relationships; and output one or more signals indicating whether the properties have been successfully verified.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 4 is a schematic diagram illustrating two's complement number format;

Figure 1:
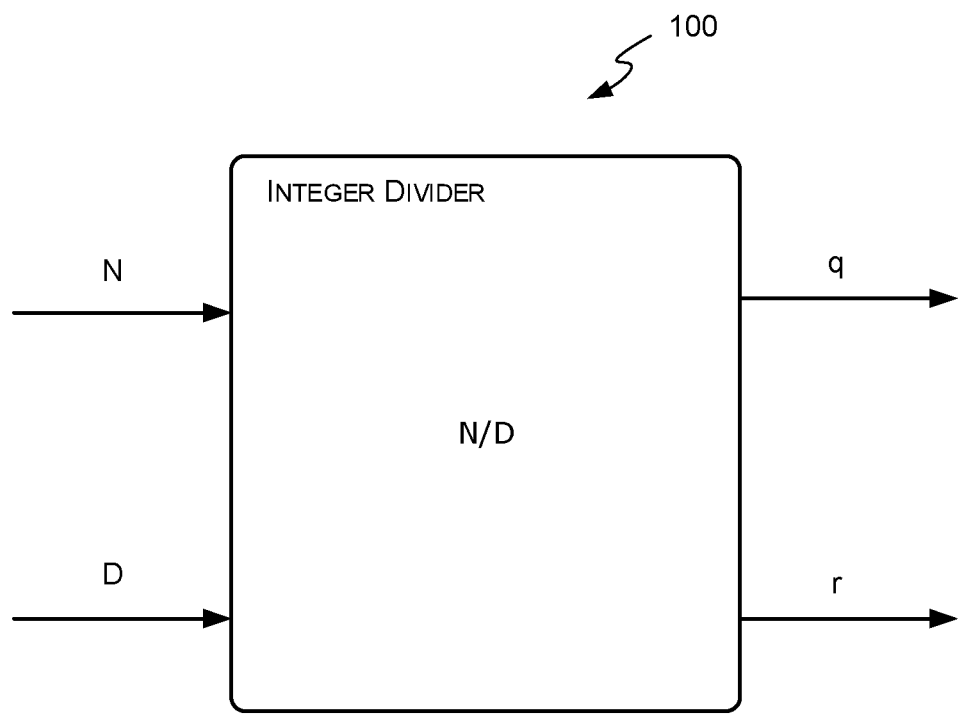
FIG. 1 is a schematic diagram of an example integrated circuit implementing integer division.

The accompanying drawings illustrate various examples. The skilled person will appreciate that the illustrated elements boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, an integrated circuit that implements integer division 100 (e.g. an integer divider) receives as inputs a numerator N and a denominator D, performs (via hardware logic) the operation N divided by D $$\left(i.e. \ \frac{N}{D}\right),$$

and outputs the quotient q and the remainder r of the operation, wherein N=D*q+r, N, D, q and r are integers, and r satisfies one or more conditions. For example, in some cases the integrated circuit may be configured to generate r and q so that |r|<|D| and (sign(N)=sign (r)) or (r=0). However, it will be evident to a person of skill in the art that the integrated circuit may be configured to generate r and q so that r satisfies other conditions.

Generating an integrated circuit that implements integer division 100 typically includes developing an integrated circuit hardware design that describes the structure and function of an integrated circuit to implement integer division; verifying or testing the integrated circuit hardware design to ensure that an integrated circuit manufactured according to the design will behave as expected; and once verified, manufacturing an integrated circuit, at an integrated circuit manufacturing system, in accordance with the integrated circuit hardware design.

Verifying the operation, or behavior, of an integrated circuit hardware design to implement integer division comprises verifying that an instantiation of the integrated circuit hardware design will produce the correct (or expected) output pair q, r in response to each possible input pair N, D. In some examples, verifying the operation of an integrated circuit hardware design to implement integer division may comprise verifying that the output pair q, r satisfies N=D*q+r for all possible input pairs (i.e. all possible combinations of numerators N and denominators D) and that r satisfies one or more conditions (e.g. |r|<|D| and (sign(N)=sign (r)) or (r=0)).

An integrated circuit hardware design may be verified, for example, by formal verification or simulation-based verification. Formal verification is a systematic process that uses a mathematical model of the integrated circuit hardware design and mathematical reasoning to verify the integrated circuit hardware design. In contrast, simulation-based verification is a process in which an integrated circuit hardware design is tested by applying stimuli to an instantiation of the integrated circuit hardware design and monitoring the output of the instantiation of the integrated circuit hardware design in response to the stimuli.

Exhaustive verification of an integrated circuit hardware design comprises verifying, via an instantiation of the integrated circuit hardware design, that an integrated circuit manufactured according to the design will behave as expected for all accepted inputs. Exhaustive verification of an integrated circuit hardware design to implement integer division via simulation is typically not feasible, particularly when the inputs (N, D) to the integer division are large (e.g. 32 bits or more), due to the large number of stimuli that would need to be applied to an instantiation of the integrated circuit hardware design to test all possible input pairs.

While formal verification can be an effective method for exhaustively verifying properties of an integrated circuit hardware design, this is only true if the properties that are to be verified are presented in such a manner that a formal verification tool can solve the mathematical problem presented thereby. Specifically, during formal verification of an integrated circuit hardware design the integrated circuit hardware design is represented as a mathematical model, the properties to be proved are also represented mathematically, and mathematical reasoning is used to determine if the properties are true for the integrated circuit hardware design based on the mathematical model. In other words, in formal verification the verification is presented as a mathematical problem to be solved. Some mathematical problems will be solvable within a reasonable amount of time by a formal verification tool whereas others will not. When a formal verification tool is able to solve the mathematical problem presented by the integrated circuit hardware design and the properties to be verified then the formal verification is said to converge. When, however, a formal verification tool is unable to solve the mathematical problem presented by the integrated circuit hardware design and the properties to be verified, then the formal verification does not converge and no results are output and the verification is inconclusive.

Various methods have been attempted to formally verify integrated circuit hardware designs to implement integer division such as (a) formally verifying that the integrated circuit hardware design is functionally equivalent to a high-level model of the integrated circuit (the model may be developed from scratch or may be based on native operators such as "/" and "%"); (b) formally verifying the functionality of the integrated circuit hardware design based on partial quotient and remainder results produced at intermediate points in the calculation (which may or not be explicitly output resulting in accessing an internal signal which is prone to error); and (c) formally verifying for all possible input pairs (i.e. all possible combinations of numerators N and denominators D) that the corresponding output pairs q, r satisfy N=D*q+r and that r satisfies one or more conditions (e.g. |r|<|D| and (sign(N)=sign (r)) or (r=0)). However, formal verification methods (a) and (c) have not been able to converge (e.g. they have not been able to produce a result (e.g. the property/properties have been successfully verified or not)) for hardware designs to implement integer division that have large input bit widths (e.g. inputs with 32 bits or more) and formal verification method (b) is prone to error and relies on whitebox properties which are implementation dependent.

It has been identified that formal verification tools, particularly formal equivalence checkers (which are described in more detail below), can efficiently verify properties of hardware designs that are similar. Accordingly, described herein are methods and systems for exhaustively verifying an integrated circuit hardware design to implement integer division that take advantage of the implementation similarity of the integrated circuit hardware design for groups of input pairs. In particular, the methods take advantage of the implementation similarity for groups of input pairs to (i) verify the integrated circuit hardware design will produce the correct output pair for a subset of the possible input pairs; and (ii) use range reduction to prove the integrated circuit hardware design will produce the correct output pair for the remaining input pairs.

The methods described herein include:
(1) verifying a base property to verify that an instantiation of the hardware design will generate a correct output pair q, r (e.g. the output pair satisfies N=D*q+r, and |r|<|D|) in response to any input pair N, D in a subset of non-negative input pairs; and
(2) formally verifying, using a formal verification tool, one or more range reduction properties to verify that if an instantiation of the hardware design will generate an output pair q, r in response to a non-negative input pair N, D then an instantiation of the hardware design will generate an output pair q', r' that has a predetermined relationship with q and r in response to another input pair N', D where N and N' have one of one or more predetermined relationships Verifying the base property and the one or more range reduction properties exhaustively verifies the integrated circuit hardware design to implement integer division over the non-negative input pairs N, D (i.e. N≥0, and D>0). Where the integrated circuit hardware design is configured to process negative inputs (i.e. N<0 and/or D<0) the methods may further comprise verifying one or more sign relation properties to verify the integrated circuit hardware design to implement integer division over the negative input pairs N, D (i.e. N<0 and/or D<0).

The methods and systems described herein take advantage, or exploit, the implementation similarity of the integrated circuit hardware design in processing related inputs. In particular, the methods and systems described herein exploit the fact that an integrated circuit hardware design to implement integer division will process input pairs N, D with certain predetermined relationships in a similar manner. Since formal verification tools, can efficiently verify aspects of an integrated circuit hardware design that are similar the formal verification performed by the methods and systems described herein will likely converge thus allowing exhaustive verification of an integrated circuit hardware design to implement integer division.

Figure 2:
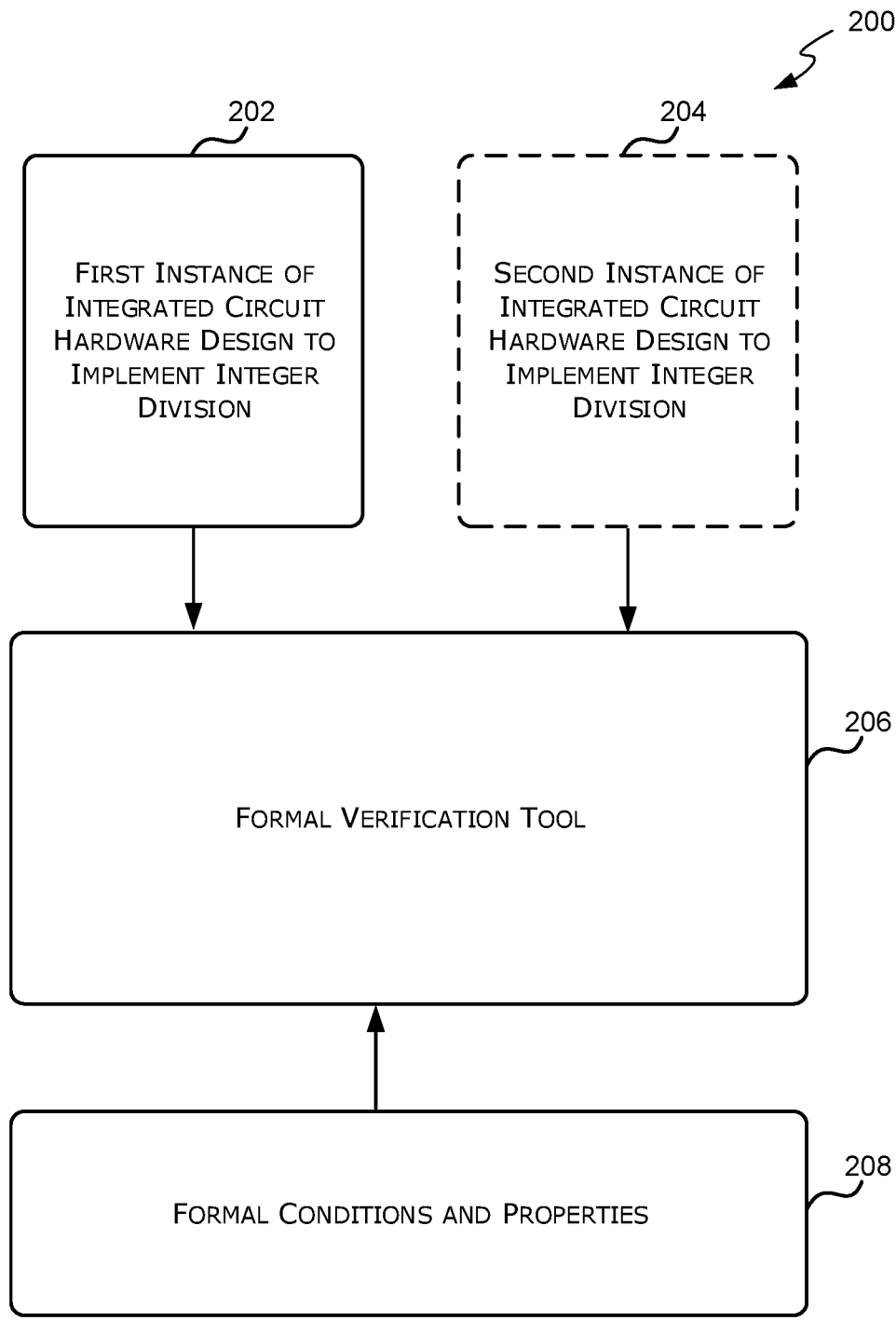
FIG. 2 is a block diagram of an example system for verifying an integrated circuit hardware design to implement integer division.

Reference is now made to FIG. 2 which illustrates an example system 200 for verifying an integrated circuit hardware design to implement integer division. The system 200 may be implemented by one or more computing-based devices, such as the computing-based device 700 described below with reference to FIG. 7. For example, one or more of the components of the system 200 of FIG. 2 may be implemented as computer-implemented instructions which, when executed by a processor, cause the processor to perform the functions described below.

The system 200 comprises one or more instances of the integrated circuit hardware design to implement integer division 202, 204; a formal verification tool 206; and formal conditions and properties 208. In general, the formal verification tool 206 formally verifies that the formal properties of the formal conditions and properties 208 are true for the integrated circuit hardware design 202 under the conditions specified in the formal conditions and properties 208 using mathematical reasoning.

An "integrated circuit hardware design", which may also be referred to herein as simply a "hardware design", is a description of the structure and function of an integrated circuit which when processed at an integrated circuit manufacturing system causes the integrated circuit manufacturing system to generate an integrated circuit described by the hardware design. For example, as described in more detail below with respect to FIG. 8, when an integrated circuit hardware design is processed at an integrated circuit manufacturing system the integrated circuit manufacturing system may generate the integrated circuit by synthesizing the hardware design into silicon, or, by loading configuration data into an a field-programmable gate array (FPGA).

An integrated circuit hardware design may be implemented in a high level hardware description language (HDL), such as, but not limited to, a register transfer level (RTL) language. Examples of register transfer level languages include, but are not limited to, VHDL (VHSIC Hardware Description Language) and Verilog. It will be evident to a person of skill in the art that other high level hardware description languages may be used such as proprietary high level hardware description languages.

An "instantiation of an integrated circuit hardware design", which also may be referred to herein as an "instantiation of a hardware design", is a representation of the hardware and/or functionality of the hardware defined by the hardware design. An instantiation of a hardware design includes, but is not limited to, an emulation model of the integrated circuit hardware design that simulates the behavior of the hardware defined by the hardware design, a synthesized version (e.g. netlist) of the hardware design, a hardware implementation (e.g. integrated circuit or a field-programmable gate array (FPGA)) of the hardware design, and a mathematical model of the hardware design generated by a formal verification tool. An instantiation of the hardware design embodies the hardware design in a form which can be tested to verify the hardware design.

Accordingly the integrated circuit hardware design to implement integer division 202, 204 is a description of the structure and function of an integrated circuit to implement integer division, which, when processed at an integrated circuit manufacturing system causes the integrated circuit manufacturing system to generate an integrated circuit that implements integer division.

The formal verification tool 206 is a software tool that is capable of performing formal verification of an integrated circuit hardware design. Formal verification tools 206 include, but are not limited to, formal model checkers (which also may be referred to as formal property checkers) which are configured to formally verify a property of an integrated circuit hardware design; and formal equivalence checkers which are configured to formally verify the equivalence of two designs (e.g. two integrated circuit hardware designs, or an integrated circuit hardware design and a netlist etc.). Examples of formal model checkers include, but are not limited to, OneSpin 360 DV™, Mentor Graphics Questa® Formal Verification, Synopsys® VC Formal, Cadence® Incisive® Enterprise Verifier, and JasperGold®. Examples of formal equivalence checkers include, but are not limited to Synopsys® HECTOR, JasperGold® Sequential Equivalence Checking (SEC) App, and other logical equivalence checkers (LECs) and sequential logical equivalence checkers (SLECs).

Formal verification is a systematic process that uses mathematical reasoning to verify a property in an integrated circuit hardware design. Formal verification can be contrasted to simulation-based verification in which an integrated circuit hardware design is tested by applying stimuli to an instantiation of the integrated circuit hardware design and monitoring the output of the instantiation of the integrated circuit hardware design in response to the stimuli.

In formal verification the integrated circuit hardware design (e.g. integrated circuit hardware design to implement integer division 202, 204) is transformed into a mathematical model (e.g. a state-transition system, or a flow graph) to thereby provide an instantiation of the hardware design which can be tested to verify the integrated circuit hardware design, and the formal properties to be verified (e.g. the properties specified in the formal conditions and properties 208) are expressed using mathematical logic using a precise syntax or a language with a precise mathematical syntax and semantics.

A formal property is verified by searching the entire reachable state space of the instantiation of the hardware design (e.g. state-transition system, or flow graph) without explicitly traversing all the states. The search is done by, for example, encoding the states using efficient Boolean encodings using Binary decision diagrams (BDDS), or using advanced SAT (satisfiability-based bounded model checking) based techniques. In some cases tools can be used to implement techniques, such as, but not limited to, abstraction, symmetry, symbolic indexing, and invariants to improve performance and achieve scalability. Since formal verification of a property algorithmically and exhaustively explores all valid input values over time, verifying a property in this manner allows a property to be exhaustively proved or disproved for all valid states.

When the formal verification tool 206 is used to verify a property, the formal verification tool 206 may output an indication of whether or not the property is valid (i.e. is true for all valid states or sequence of states), which may also be referred to herein as the property being successfully verified. The output may be yes the property is valid or has been successfully verified; no the property is not valid (i.e. it is not true or has failed for at least one valid state or sequence of states) or has not been successfully verified; or the formal verification was inconclusive. The formal verification may be inconclusive, for example, because the computing-based device running the formal verification tool 206 has run out of memory or because the formal verification tool 206 has determined that a certain amount of progress has not been made after a predefined period of time.

Where a property is not valid or has not been successfully verified, the formal verification tool 206 may also output information indicating a state or sequence of states of the integrated circuit hardware design to implement integer division 202, 204 which causes the property to fail. For example, the formal verification tool 206 may output a trace of the verification indicating at what point, state or sequence of states the failure occurred.

The formal conditions and properties 208 specify the properties of the integrated circuit hardware design to implement integer division 202, 204 to be verified by the formal verification tool 206 and the conditions under which the properties are to be verified.

As is known to those of skill in the art, a property of an integrated circuit hardware design is a statement or expression that captures design behavior. For example, a simple property may be a=b. Within HDL designs, a property is an executable statement that checks for specific behavior within the HDL design. For example, if a design contains a FIFO (first in first out) buffer a formal property may be that neither overflow nor underflow of the FIFO may occur. Properties are used to capture required or desired temporal behavior of the hardware design in a formal and unambiguous way. The hardware design can then be verified to determine that it conforms to the required or desired behavior as captured by one or more properties.

In the embodiments described herein the formal conditions and properties 208 cause the formal verification tool 206 to formally verify at least a base property and one or more range reduction properties to exhaustively verify the operation of an instantiation of the integrated circuit hardware design to implement integer division for all non-negative input pairs N, D (i.e. $N \geq 0$ and $D > 0$).

The base property is configured to verify the operation of an instantiation of the integrated circuit hardware design for a subset of non-negative input pairs. In particular, the base property is configured to verify that in response to any input pair N, D in a subset of non-negative input pairs an instantiation of the integrated circuit hardware design will generate a correct output pair q, r (e.g. the output pair q, r satisfies $N=D*q+r$ and $|r|<|D|$). Ideally the base property relates to a relatively small subset of non-negative input pairs and is simple to verify. In some examples, which will be described in more detail below, the base property is configured to verify for non-negative input pairs N, D where N<D that q=0 and r=N. In other examples, which will be described in more detail below, the base property is configured to verify for non-negative input pairs N, D where N=0 that q=0 and r=0.

The one or more range reduction properties are configured to use inductive range reduction to prove an instantiation of the integrated circuit hardware design will produce the correct output pair for the remaining non-negative input pairs. In particular, the one or more range reduction properties are configured to verify that if an instantiation of the integrated circuit hardware design correctly processes a first non-negative input pair N, D that the instantiation of the integrated circuit hardware design correctly processes a second non-negative input pair N', D where N and N' have one of one or more predetermined relationships by verifying that the output pair q, r and q', r' corresponding to the first and second input pairs have a predetermined relationship.

In other words, the one or more range reduction properties are configured to verify that if an instantiation of the integrated circuit hardware design produces a output pair q, r for a non-negative input pair N, D that an instantiation of the integrated circuit hardware design produces an output pair q', r' that has a predetermined relationship with q and r in response to another input pair N', D where N and N' have one of one or more predetermined relationships.

In some cases, there may be one range reduction property and in other cases there may be more than one range reduction property. The range reduction properties are configured to take advantage of the implementation similarity of the integrated circuit hardware design. In other words the range reduction properties are selected to take advantage of sets of input pairs (e.g. input pairs that have a predetermined relationship) which will be processed by an instantiation of the integrated circuit hardware design in a similar manner.

In some cases, as will be described in more detail below, the predetermined relationships between N and N' include N'=2N and N'=2N+1. In these cases the range reduction properties are configured to verify that if the instantiation of the integrated circuit hardware design correctly processes a first input pair N, D (e.g. the output pair q, r satisfies $N=D*q+r$ and $|r|<|D|$) then the instantiation of the integrated circuit hardware design also correctly processes a second input pair N', D where N'=2N or N'=2N+1 by verifying that the output pairs q, r and q', r' corresponding to the first and second input pairs respectively have a predetermined relationship. In these cases the range reduction properties may include the following:

N'=2N
    If N'=2N and 2r<D then:
      r'=2r
      q'=2q
    If N'=2N and 2r$\geq$D then:
      r'=2r−D
      q'=2q+1
N'=2N+1
    If N'=2N+1 and 2r+1<D then:
      r'=2r+1
      q'=2q
    If N'=2N+1 and 2r+1$\geq$D then:
      r'=2r+1−D
      q'=2q+1

Based on the principles of induction, verifying the base property and the one or more range reduction properties verifies that an instantiation of the integrated circuit hardware design to implement integer division 202 will correctly process (e.g. the output pairs q, r satisfy $N=D*q+r$ and $|r|<|D|$) all the non-negative input pairs N, D (i.e. $N \geq 0$ and $D > 0$). In particular, as described above, verifying the base property for the integrated circuit hardware design to implement integer division 202 verifies that an instantiation of the integrated circuit hardware design will work correctly for a subset of non-negative input pairs (i.e. that an instantiation of the integrated circuit hardware design will produce the correct output pair in response to any input pair in the subset of non-negative input pairs). In other words the base property verifies a subset of non-negative input pairs for the integrated circuit hardware design to implement integer division.

Verifying the one or more range reduction properties for the integrated circuit hardware design to implement integer division 202 verifies that an instantiation of the integrated circuit hardware design to implement integer division 202 will, over all non-negative input pairs, produce related output pairs for two input pairs that have one or more predetermined relationships (referred to as the range reduction relationships). In other words verifying the one or more range reduction properties verifies that for two input pairs having a range reduction relationship, the corresponding output pairs will have a predetermined relationship. Thus if an instantiation of the integrated circuit hardware design produces the correct output for one of the input pairs then the instantiation of the integrated circuit hardware design must produce a correct output pair for the other input pair.

When the base property and the range reduction properties are defined such that all of the non-negative input pairs that are not verified by the base property (i.e. the input pairs not in the subset of non-negative input pairs) can be reached by repeatedly applying the range reduction relationship(s), verifying the base property and range reduction properties verifies the integrated circuit hardware design over all the non-negative input pairs. Specifically if the base property and the range reduction properties are configured such that all of the input pairs that are not verified by the base property are related (via a range reduction relationship) to at least one input pair verified by the base property, then if the base property is true (i.e. an instantiation of the integrated circuit hardware design works produces the correct result for the subset of non-negative input pairs), and the range reduction properties are true (i.e. the output pairs for related input pairs have a predetermined relationship) then all of the remaining input pairs are related to a verified input pair and thus their related outputs must also be correct since they have the expected relationship with an explicitly verified output pair.

Verifying relationships between output pairs for related input pairs (via the one or more range reduction properties) instead of explicitly verifying all the output pairs are correct for all input pairs increases the chances that the formal verification will converge.

Where the integrated circuit hardware design to implement integer division 202 is configured to accept and process non-negative input pairs N, D (i.e. N<0 and/or D<0) the formal conditions and properties 208 may be configured to further cause the formal verification tool 206 to formally verify one or more sign relation properties to verify that the integrated circuit hardware design to implement integer division 202 also correctly processes all the negative input pairs N, D (i.e. N<0 and/or D<0). The sign relation properties are based on the fact that if two pairs of inputs (N, D and N', D') differ only by the sign of one or more of the inputs (e.g. N'=−N and/or D'=−D) that the corresponding output pairs (q, r and q', r') will have a predetermined relationship. In other words the sign relation properties are based on the fact that the integrated circuit hardware design will be symmetric about positive and negative inputs. Accordingly, the sign relation properties are used to verify that if an instantiation of the integrated circuit hardware design produces an output pair q, r in response to an input pair N, D that an instantiation of the integrated circuit hardware design will produce an output pair q', r' that has a predetermined relationship with q, r in response to another input pair N', D' where N'=−N and/or D'=−D.

The integrated circuit hardware design will be configured to implement particular sign relationships between positive and negative inputs and the particular sign relation properties will be based on the particular sign relationships implemented. For example, if N=D*q+r then the integrated circuit hardware design may be configured such that N=(−D)*(−q)−r, −N=D*(−q)−r, and N=(−D)*(−q)+r. In this example if an input pair (N, D) produces an output pair (q, r) then an input pair (N, −D) will produce an output pair (−q, r); an input pair (−N, −D) will produce an output pair (q, −r); and an input pair (−N, D) will produce an output pair (−q, −r). It will be evident it that this is an example only and other sign relationships may exists between positive and negative inputs.

Accordingly where N and D are non-negative inputs:
If N=D*q+r and N'=N and D'=−D, then N'=−(D'*q)+r so the one or more sign relation properties may be configured to verify:
q'=−q
r'=r
If N=D*q+r and N'=−N and D'=D, then N'=−(D' *q)−r so the one or more sign relation properties may be configured to verify:
q'=−q
r'=−r
If N=D*q+r and N'=−N and =−D, then N'=D'*q−r so the one or more sign relation properties are configured to verify:
q'=q
r'=−r In some cases verifying the base property, one or more range reduction properties, and one or more sign relation properties may not exhaustively verify the operation of an instantiation of the integrated circuit hardware design over the entire input space. For example, where an integrated circuit hardware design to implement integer division is configured to use a two's complement format to represent signed binary inputs (N, D) and outputs (q, r) the sign relation properties described above will not verify the operation of the integrated circuit hardware design for the largest possible negative numerator N and the largest possible negative denominator D. This is because there is one more negative number than positive number that can be represented in two's complement format.

This can be explained with reference to FIG. 4 which shows an example two's complement format for a binary number represented by k+2 bits from bit $n_0$ to bit $n_{k+1}$ where bit $n_0$ is the least significant bit and bit $n_{k+1}$ is the most significant bit and the sign bit. The value of the number represented in such a format can be calculated by the following formula: $-n_{k+1}*2^{k+1}+n_k*2^k+n_{k-1}*2^{k-1}\ldots+n_0*2^0$. Accordingly the largest possible positive number is represented by a zero followed by all ones, and the largest possible negative number is represented by a one followed by all zeros. This results in an additional representable negative number compared to the representable positive numbers. For example, the largest positive number representable by an 8-bit two-complement format is "01111111" which is equal to 127, whereas the largest negative number representable by an 8-bit two's complement format is "10000000" which is equal to −128.

Accordingly verifying that for any positive value of N or D that the corresponding negative value will be processed correctly will not verify the largest possible negative value of N and the largest possible negative value of D because there will be no corresponding positive value.

Not all integrated circuit hardware designs to implement integer division are configured to accept and process input pairs where the numerator is the largest possible negative numerator N (e.g. $-2^{k+1}$ in the example of FIG. 4). However, where the integrated circuit hardware design to implement integer division 202 under test is configured to accept and process such input pairs, the formal conditions and properties 208 may be further configured to cause the formal verification tool to verify one or more largest negative numerator properties to verify that the integrated circuit hardware design correctly processes input pairs where the numerator is the largest possible negative numerator N. Example largest negative numerator properties will be described below.

Similarly not all integrated circuit hardware designs to implement integer division are configured to accept and process input pairs where the denominator is the largest possible negative denominator D (e.g. $-2^{k+1}$ in the example of FIG. 4). However, where the integrated circuit hardware design to implement integer division 202 under test is configured to accept and process such input pairs, the formal conditions and properties 208 may be further configured to cause the formal verification tool 206 to verify one or more largest negative denominator properties to verify that the integrated circuit hardware design correctly processes input pairs where the denominator is the largest possible negative denominator D. Example largest negative denominator properties will be described below.

It will be evident to a person of skill in the art that this is an example only and that other formats (such as, but not limited to, sign-modulus) may be used to represent negative numbers which may cause one or more input pairs to be left unverified after the base, range reduction, and sign relation properties have been verified and that the formal conditions and properties may be modified to include one or more properties that are configured to verify that an instantiation of the integrated circuit hardware design will operate as expected in response to these unverified input pairs.

A property that relates at least two input pairs (e.g. N, D and N', D') and corresponding output pairs (q, r and q', r') (such as the range reduction and sign relation properties described above) may be expressed in relation to two instances of the integrated circuit hardware design, or a single instance of the integrated circuit hardware design. For example, in some cases N, D and q, r may be described as corresponding to inputs and outputs of a first instance of the integrated circuit hardware design and N', D' and q', r' may be described as corresponding to inputs and outputs of a second instance of the integrated circuit hardware design. In these cases, the formal verification comprises performing a comparison of two instances of the integrated circuit hardware design (e.g. in the same clock cycle). Accordingly it may be beneficial in these cases that the formal verification tool be a formal equivalence checker since formal equivalence checkers are designed and optimized for comparing two designs. While using a formal equivalence checker in these cases may provide certain advantages (e.g. in terms of efficiency), a person of skill in the art would understand that this does not, however, preclude the use of a formal model checker in such cases.

In other cases N, D and q, r may be described as corresponding to inputs and outputs of a particular clock cycle (e.g. first clock cycle) of an instance of the integrated circuit hardware design and N', D' and q', r' may be described as corresponding to inputs and outputs of another clock cycle (e.g. second clock cycle) of the same instance of the integrated circuit hardware design. In these cases, the formal verification comprises evaluating states of a single instance of the integrated circuit hardware design. Accordingly it may be beneficial in these cases that the formal verification tool be a formal model checker (or formal property checker) since formal model checkers are optimized to verify properties of a single design over several clock cycles. While using a formal model checker in these cases may provide certain advantages (e.g. in terms of efficiency), a person of skill in the art would understand that this does not, however, preclude the use of a formal equivalence checker in such cases.

Although the formal conditions and properties 208 of FIG. 2 have been described as causing a formal verification tool 206 to formally verify the formal properties described therein it will be evident to one of skill in the art that in other examples one or more of the properties may be verified using other verification techniques where suitable (e.g. where another technique can be used to exhaustively verify the property within a reasonable amount of time). For example, one or more of: the base property, the one or more largest negative numerator properties, and the one or more largest negative denominator properties may be verified using other techniques, such as simulation-based verification techniques, instead of being formally verified by a formal verification tool. In these examples the system 200 may comprise one or more other verification tools, such as a simulation tool (not shown), for verifying a property using another verification technique.

Figure 3:
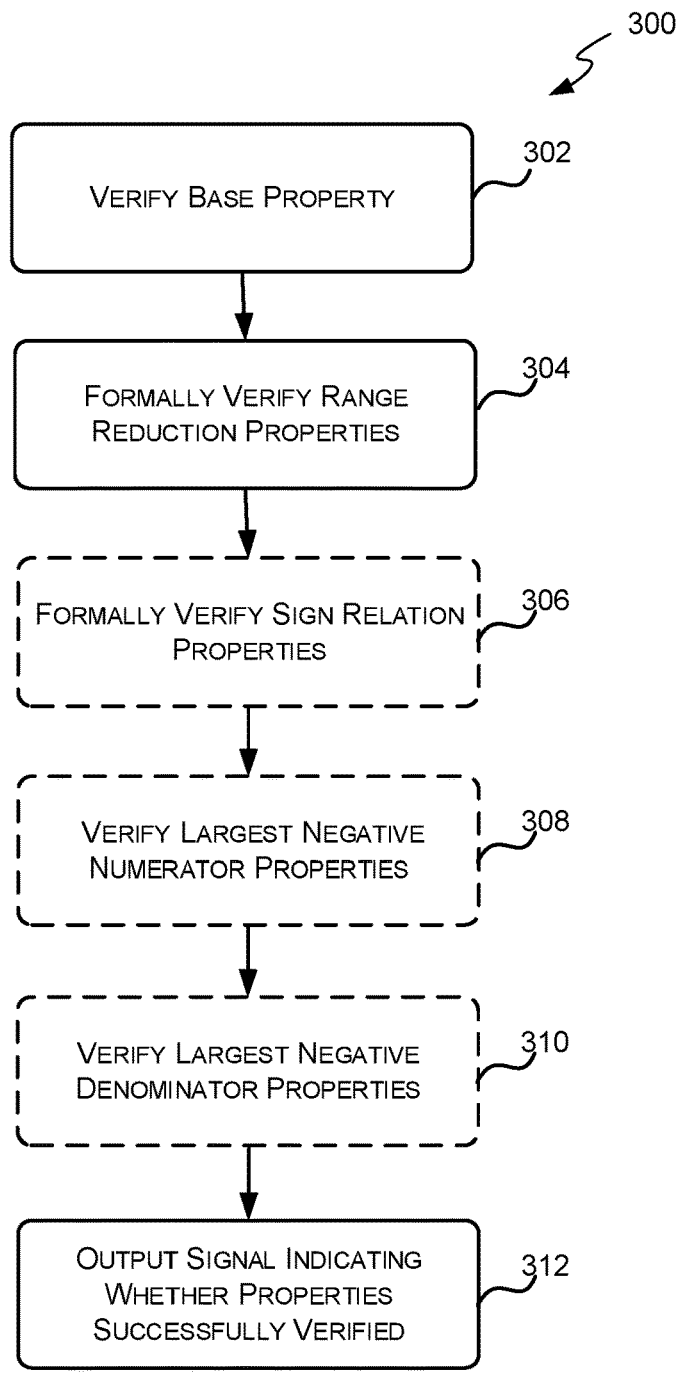
FIG. 3 is a flow diagram of an example method for verifying an integrated circuit hardware design to implement integer division.

Reference is now made to FIG. 3 which illustrates an example method 300 of verifying an integrated circuit hardware design to implement integer division. The method 300 begins at block 302 where a base property is verified for the integrated circuit hardware design to implement integer division. As described above, the base property is designed to verify that for any input pair N, D in a subset of non-negative input pairs N, D (i.e. N≥0, D>0) an instantiation of the integrated circuit hardware design will generate a correct output pair q, r (e.g. the output pair satisfies $N=D*q+r$ and $|r|<|D|$). Example base properties are described below. The base property may be formally verified using a formal verification tool (such as the formal verification tool 206 of FIG. 2) or the base property may be verified using another verification technique, such as simulation-based verification. Once the base property has been verified the method 300 proceeds to block 304.

At block 304, one or more range reduction properties are formally verified, using a formal verification tool (such as the formal verification tool 206 of FIG. 2), for the integrated circuit hardware design to implement integer division. As described above, the one or more range reduction properties are designed to verify that if an instantiation of the integrated circuit hardware design generates an output pair q, r in response to a non-negative input pair N, D that an instantiation of the integrated circuit hardware design will produce an output pair q', r' that has a predetermined relationship with q and r in response to another input pair N', D where N and N' have one of one or more predetermined relationships. Example range reduction properties are described below.

The base property and the range reduction properties are selected so that once the base property and the one or more range reduction properties have been verified the integrated circuit hardware design has been exhaustively verified over the non-negative input pairs. Accordingly, if the integrated circuit hardware design is not configured to accept and process negative inputs then the verification is complete and the method 300 may proceed directly to block 312. If, however, the integrated circuit hardware design is configured to accept and process negative inputs then the method 300 may proceed to block 306.

At block 306, one or more sign relation properties are verified, using a formal verification tool (such as the formal verification tool 206 of FIG. 2), for the integrated circuit hardware design to implement integer division. As described above, the sign relation properties are designed to verify that if an instantiation of the integrated circuit hardware design generates an output pair q, r in response to a non-negative input pair N, D then an instantiation of the integrated circuit hardware design will generate an output pair q', r' that has a predetermined relationship with q and r in response to another input pair N', D' where N'=−N and/or D'=−D. Example sign relation properties were described above in relation to FIG. 2.

Once the sign relation properties have been formally verified the integrated circuit hardware design has been exhaustively verified over all input pairs, with the exception of input pairs where the numerator is the largest negative numerator and input pairs where the denominator is the largest negative denominator, in some cases. As described above, this is because when the two's-complement format is used to represent the numerator and denominator there will be one additional representable negative number than positive number. If the integrated circuit hardware design is not configured to accept and process input pairs where the numerator is the largest negative numerator then the method 300 may proceed directly to block 310 or 312. If, however the integrated circuit hardware design is configured to accept and process input pairs where the numerator is the largest negative numerator then the method 300 may proceed to block 308.

At block 308, one or more largest negative numerator properties are verified to verify that the instantiation of the hardware design correctly processes input pairs N, D where the numerator N is the largest possible negative numerator. Example largest negative numerator properties are described below. The one or more largest negative numerator properties may be formally verified using a formal verification tool (such as the formal verification tool 206 of FIG. 2) or the one or more largest negative numerator properties may be verified using other verification techniques, such as simulation-based verification.

If the integrated circuit hardware design is not configured to accept and process input pairs where the denominator is the largest negative denominator then the method 300 may proceed directly to block 312. If, however the integrated circuit hardware design is configured to accept and process input pairs where the denominator is the largest negative denominator then the method 300 may proceed to block 310.

At block 310, one or more largest negative denominator properties are verified to verify that the instantiation of the hardware design correctly processes input pairs N, D where the denominator D is the largest possible negative denominator. Example largest negative denominator properties are described below. The one or more largest negative denominator properties may be formally verified using a formal verification tool (such as the formal verification tool 206 of FIG. 2) or the one or more largest negative denominator properties may be verified using other verification techniques, such as simulation-based verification. Once the largest negative denominator properties are verified the method 300 proceeds to block 312.

At block 312, the verification system outputs one or more output signals that indicate whether the properties have been successfully verified. Once the verification system has output the one or more signals the method 300 may end. Although FIG. 3 shows that the method 300 comprises a single block at the end of the method 300 in which the one or more signals indicating whether the properties were successfully verified are output, in other example methods the verification system may be configured to output a signal after the verification of each property to indicate whether that particular property was successfully verified.

If the one or more output signals indicate that one or more properties were not successfully verified then it is likely that there is an error in the integrated circuit hardware design to implement integer division. Accordingly, in some cases, in response to the one or more output signals indicating one or more properties were not successfully verified the integrated circuit hardware design is modified to correct the error or bug in the integrated circuit hardware design. The method 300 may then be repeated to verify the modified integrated circuit hardware design.

If the one or more output signals indicate that all of the properties were successfully verified then the integrated circuit hardware design has been successfully verified. In some cases, in response to the one or more output signals indicating that all of the properties were successfully verified then the integrated circuit hardware design may be provided to an integrated circuit manufacturing system to generate an integrated circuit in accordance with the verified integrated circuit hardware design as described below with reference to FIG. 8.

Figure 5:
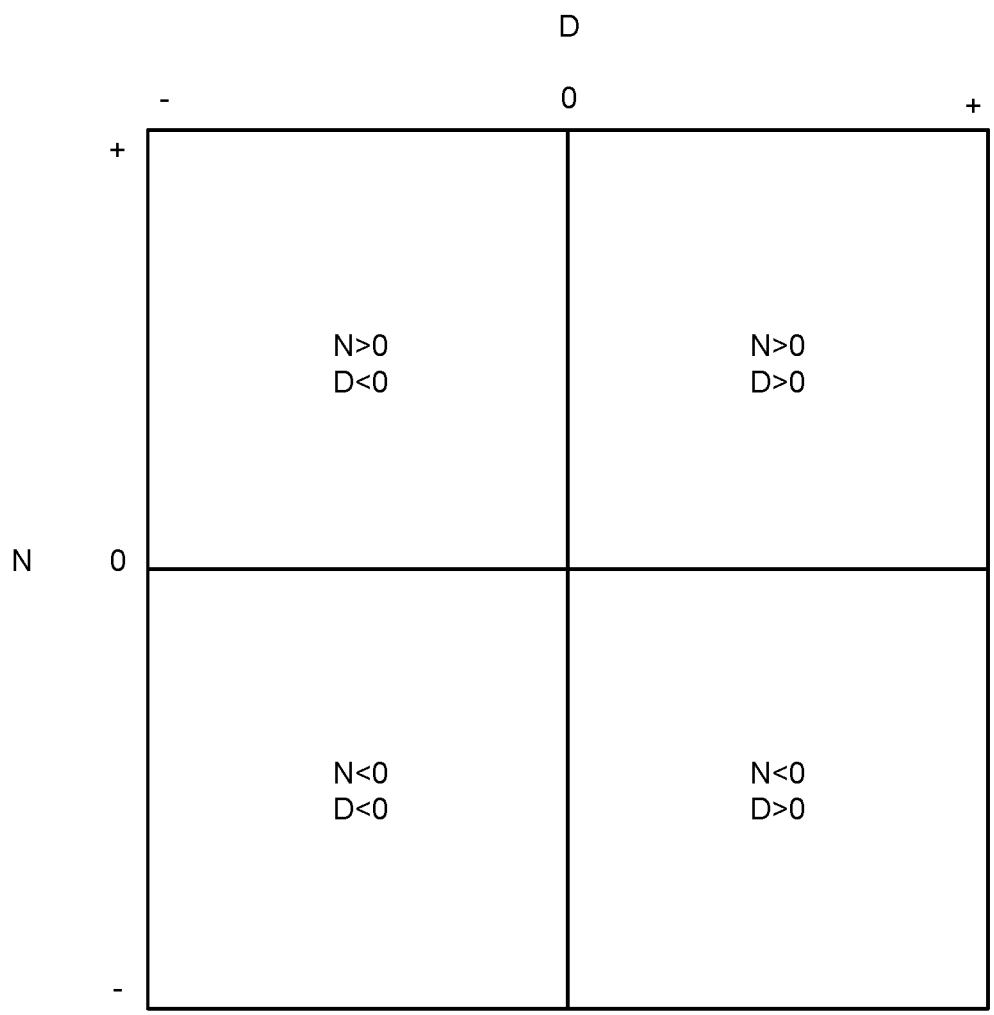
FIG. 5 is a schematic diagram illustrating the input domain of an integer divider.
Figure 6:
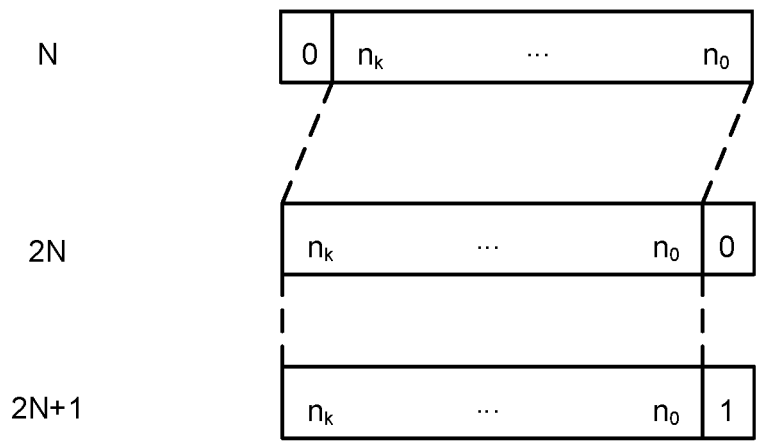
FIG. 6 is a schematic diagram illustrating the relationship between binary numbers N, 2N and 2N+1.

Reference is made to FIG. 5 (square graph) which illustrates the possible input domain of an integrated circuit hardware design to implement integer division. The integrated circuit hardware design is verified over the non-negative inputs pairs N, D ($N \geq 0$, $D > 0$) by formally verifying the base property and the one or more range reduction properties; the integrated circuit hardware design is verified over the negative input pairs N, D ($N < 0$ and/or $D < 0$), with the exception of input pairs where the numerator is the largest negative numerator and/or the denominator is the largest negative denominator, by formally verifying the one or more sign relation properties; and the integrated circuit hardware design is verified over input pairs where the numerator is the largest negative numerator and input pairs where the denominator is the largest negative denominator by formally verifying the one or more largest negative numerator properties and the one or more largest negative denominator properties respectively.

First Example Set of Base and Range Reduction Properties

A first example set of base and range reduction properties will now be described.

As described above, the base property is used to verify that for a subset of non-negative input pairs N, D the corresponding output pairs q, r are correct (e.g. the output pairs q, r satisfy $N=D*q+r$ and $|r|<|D|$). Ideally the base property relates to a relatively small subset of non-negative input pairs and is simple to verify. In the first example set of base and range reduction properties, the base property is used to verify that for non-negative input pairs, where $N<D$, the corresponding output pairs q, r satisfy $N=D*q+r$ and $|r|<|D|$. When $N<D$, $q=0$ and $r=N$ thus the base property in this example can be stated as: for the subset of non-negative input pairs N, D wherein $N<D$, the corresponding output pairs q, r satisfy $q=0$ and $r=N$. This base property is simple for a formal verification tool (e.g. formal verification tool 206) to solve since it avoids the complexities of negative numbers, and a comparison of r with N can be efficiently completed.

As described above, the range reduction property or properties are used to verify that if a first output pair q, r is generated in response to a first non-negative input pair N, D then a second output pair q', r' will be generated that has a predetermined relationship with q, r in response to a second non-negative input pair N', D' when D'=D and N' has one of one or more predetermined relationships with N. Accordingly, the range reduction property or properties are used to verify that if the instantiation of the integrated circuit hardware design correctly processes a first input pair N, D that the instantiation of the integrated circuit hardware design correctly processes the second input pair N', D wherein N and N' have one of one or more predetermined relationships.

In the first example set of base and range reduction properties, the predetermined relationships between N and N' includes N'=2N and N'=2N+1 because when N is a binary number 2N and 2N+1 represent the binary numbers that are one bit longer than N. For example, as shown in FIG. 4 if N is a k+1 bit binary number formed by bits $n_0$ to $n_k$ where $n_0$ is the least significant bit and $n_k$ is the most significant bit, then 2N is the binary number formed by shifting bits $n_0$ to $n_k$ to the left by one bit and setting the least significant bit to zero, and 2N+1 is the binary number formed by shifting the bits $n_0$ to $n_k$ to the left by one bit and setting the least significant bit to one. Accordingly in this example the range reduction is along the bit length. If the integrated circuit hardware design is configured to mimic long division then the computation of the quotient q and remainder r of N/D, 2N/D and (2N+1)/D will be very similar. This means that a formal verification tool will find comparing these calculations to be relatively simple.

If $N=D*q+r$ then when N'=2N, N' should be equal to $2D*q+2r$ which means that q'=2q and r'=2r when $2r<D$; or q'=2r+1 and r'=2r−D when 2r D. Specifically, if the remainder is small (i.e. $2r<D$) then doubling the remainder r will not cause the quotient q' for N' to be greater than 2q. For example, if N is ten and D is three, the quotient q will be three and the remainder r will be one; 2N is twenty which produces a quotient q' of six (2q=2*3) and a remainder r' of two (2r=2*1). Accordingly in this case q'=2q and r'=2r. In contrast, if the remainder r is large (i.e. 2r≥D) then doubling the remainder r will cause the quotient q' for N' to be greater than 2q by one. For example, if N is eleven and D is three, the quotient q will be three and the remainder r will be two; 2N is twenty-two which produces a quotient q' of seven (2q+1=2*3+1) and a remainder r' of one (2r−D=2*2−3). Accordingly in this case q'=2q+1 and r'=2r−D.

Similarly if N=D*q+r, when N'=2N+1 then N' should be equal to 2D*q+2r+1 which means that q'=2q and r'=2r+1 when 2r+1<D; and q'=2q+1 and =2r+1−D when 2r+1≥D.

Accordingly the first example set of base and range reduction properties may comprise the following range reduction properties to verify that given that an instantiation of the integrated circuit hardware design correctly processes a first input pair (N, D) that the instantiation of the integrated circuit hardware design correctly process a second input pair (N',D) wherein N' is equal to 2N or 2N+1:

N'=2N
If N'=2N and 2r<D then:
q'=2q
r'=2r
If N'=2N and 2r≥D then:
q'=2q+1
=2r−D
N'=2N+1
If N'=2N+1 and 2r+1<D then:
q'=2q
r'=2r+1
If N'=2N+1 and 2r+1≥D then:
q'=2q+1
=2r+1−D Accordingly this first example set of base and range reduction properties comprises a base property that is configured to verify that an instantiation of the integrated circuit hardware design correctly processes non-negative input pairs N, D where N<D (e.g. the corresponding output pairs q, r satisfy N=D*q+r and |r|<|D|); and range reduction properties configured to verify that if the instantiation of the integrated circuit hardware design correctly processing a non-negative input pair N, D then the hardware design correctly processes N', D where N'=2N, 2N+1.

This example can be generalized to a set of base and range reduction properties that comprises a base property that is configured to verify that an instantiation of the integrated circuit hardware design correctly processes non-negative input pairs N, D where N<D (e.g. the corresponding output pairs q, r satisfy N=D*q+r and |r|<|D|); and range reduction properties configured to verify that if the instantiation of the integrated circuit hardware design correctly processes a non-negative input pair N, D then the hardware design correctly processes N', D where N'=$2^z$N, $2^z$N+1, $2^z$N+2, . . . $2^z$N+($2^z$−1) where z is an integer. For example, if z=1 then N'=2N, 2N+1 (as in the first example), and if z=2 then N'=4N, 4N+1, 4N+2, 4N+3. The specific z may be selected based on the configuration of the integrated circuit hardware design to take advantage of implementation similarity.

While binary circuits tend to have implementations that take advantage of powers of two, thus powers of two can be processed efficiently, this example can be further generalized to a set of base and range reduction properties that comprises a base property that is configured to verify that an instantiation of the integrated circuit hardware design correctly processes non-negative input pairs N, D where N<D (e.g. the corresponding output pairs q, r satisfy N=D*q+r and |r|<|D|); and range reduction properties configured to verify that if the instantiation of the integrated circuit hardware design correctly processes a non-negative input pair N, D then the hardware design correctly processes N', D where N'=αN, αN+1, αN+2, . . . αN+(α−1). For example, if α=3 then N'=3N, 3N+1,3N+2. The specific a may be selected based on the configuration of the integrated circuit hardware design to take advantage of implementation similarity.

Second Example Set of Base and Range Reduction Properties

A second example set of base and range reduction properties will now be described.

The second example set of base and range reduction properties is the same as the first generalized example set of base and range reduction properties described above except that the base property is configured to verify that the instantiation of the integrated circuit hardware design correctly process all non-negative input pairs N, D where N<D is replaced with a base inductive property configured to verify that the instantiation of the integrated circuit hardware design correctly process all non-negative input pairs N, D where N=0. When N=0, q=0 and r=0 thus the base property in this example can be stated as: for the subset of non-negative input pairs (N, D) wherein N=0, the corresponding output pairs (q, r) satisfy q=0 and r=0. This simplifies the base property but still allows the entire non-negative input space to be verified by the base property and the range reduction properties.

Accordingly the second set of base and range reduction properties comprises a base property that is configured to verify that an instantiation of the integrated circuit hardware design will correctly process all non-negative input pairs N, D where N=0 (e.g. the output pairs q, r satisfy N=D*q+r and |r|<|D|); and range reduction properties configured to verify that if the instantiation of the integrated circuit hardware design correctly processes a non-negative input pair N, D then the hardware design correctly processes an input pair N', D where N'=$2^z$N, $2^z$N+1, $2^z$N+2, . . . $2^z$N+($2^z$−1).

Third Example Set of Base and Range Reduction Properties

A third example set of base and range reduction properties will now be described.

The third set of base and range reduction properties comprises a base property that is configured to verify that the instantiation of the integrated circuit hardware design correctly processes all non-negative input pairs N, D where N<D (e.g. the output pairs q, r satisfy N=D*q+r and |r|<|D|); and range reduction properties configured to verify that if the instantiation of the integrated circuit hardware design correctly processes a non-negative input pair N, D (e.g. N=D*q+r and |r|<|D|) then the hardware design correctly processes an input pair N', D where N'=N+D.

As described above, when N<D, q=0 and r=N. Accordingly the base property in this example can be stated as: for the subset of non-negative input pairs N, D wherein N<D, the corresponding output pairs q, r satisfy q=0 and r=N.

With respect to the range reduction properties, if N=D*q+r then when N'=N+D, N' should be equal to D*(q+1)+r which means that q'=q+1 and r'=r. Accordingly the range reduction properties may be configured to verify that if an instantiation of the integrated circuit hardware design correctly processes N, D the instantiation of the integrated circuit hardware design correctly processes N', D where N'=N+D by verifying that q'=q+1 and r'=r.

The third example set of base and range reduction properties has proven to work well for integrated circuit hardware designs to implement integer division that are configured to calculate the quotient q and remainder r by taking away the denominator from the numerator and counting.

However, unless the integrated circuit hardware design is configured to generate the quotient and remainder using this technique the formal verification of the third example set of base and range reduction properties is less likely to converge than the other example sets of base and range reduction properties described herein.

Fourth Example Set of Base and Range Reduction Properties

A fourth example set of base and range reduction properties will now be described.

The fourth example set of base and range reduction properties comprises a base property that is configured to verify that the instantiation of the integrated circuit hardware design correctly processes all non-negative input pairs N, D where N<D (e.g. the output pairs q, r satisfy N=D*q+r and |r|<|D|); and range reduction properties configured to verify that if the instantiation of the integrated circuit hardware design correctly processes a non-negative input pair N, D (e.g. N=D*q+r and |r|<|D|) then the hardware design correctly processes an input pair N', D where N'=N+1.

As described above, when N<D, q=0 and r=N. Accordingly the base property in this example can be stated as: for the subset of non-negative input pairs N, D where N<D, the corresponding output pairs q, r satisfy q=0 and r=N.

With respect to the range reduction properties, if N=D*q+r then when N'=N+1 then N' should be equal to D*(q+1)+r+1 which means that q'=q and r'=r+1 when r<D−1; and q'=q+1 and r'=0 when r=D−1. Accordingly the range reduction properties may be configured to verify that if the instantiation of the integrated circuit hardware design correctly processes N, D the instantiation of the integrated circuit hardware design correctly processes N', D when N'=N+1 by verifying that q'=q and r'=r+1 when r<D−1; and q'=q+1 and r'=0 when r=D−1.

Fifth Example Set of Base and Range Reduction Properties

A fifth example set of base and range reduction properties will now be described.

The fifth example set of base and range reduction properties comprises a base property that is configured to verify that the instantiation of the integrated circuit hardware design correctly processes all non-negative input pairs N, D where N=0 (e.g. the output pairs q, r satisfy N=D*q+r and |r|<|D|); and range reduction properties configured to verify that if the instantiation of the integrated circuit hardware design correctly processes any non-negative input pair N, D (e.g. the output pair q, r satisfies N=D*q+r and |r|<|D|) then the hardware design correctly processes an input pair N', D where N'=N+1.

As described above, when N=0, q=0 and r=0 thus the base property in this example can be stated as: for the subset of non-negative input pairs (N, D) wherein N=0, the corresponding output pairs (q, r) satisfy q=0 and r=0.

As described above, if N=D*q+r, when N'=N+1 then N' should be equal to D*(q+1)+r+1 which means that q'=q and r'=r+1 when r<D−1; and q'=q+1 and r'=0 when r=D−1. Accordingly the range reduction properties may be configured to verify that if an instantiation of the integrated circuit hardware design correctly processes N, D the instantiation of the integrated circuit hardware design correctly processes N', D when N'=N+1 by verifying that q'=q and r'=r+1 when r<D−1; and q'=q+1 and r'=0 when r=D−1.

The fourth and fifth example sets of base and range reduction properties will work well for verifying integrated circuit hardware designs to implement integer division that are configured to calculate the quotient q and remainder r by counting to the numerator N and keeping track of how many multiples of the denominator D occur. While this is not a traditional method to calculate the quotient q and remainder r, due to the simplicity of the fourth and fifth example sets of base and range reduction properties, the fourth and fifth example sets of base and range reduction properties have also proven to work well for many integrated circuit hardware designs that implement integer division via other methods. The fourth and fifth examples sets of base and range reduction properties would provide a good starting set of base and range reduction properties to verify an integrated circuit hardware design to implement integer division when the implementation details are unknown.

In general the base property and range reduction properties are configured such that the entire non-negative input space (e.g. all accepted non-negative inputs pairs N, D) can be verified by repeatedly applying the range reduction relationship(s) (the predetermined relationships between N and N') from the input pairs verified by the base property. For example, in the first and second example sets of base and range reduction properties where the range reduction relationships are N'=2N and N'=2N+1 every positive numerator N can be reached by continually doubling, or doubling plus 1, (a) N<D or (b) N=0, thus the base property can be configured to verify the subset of input pairs N, D where N<D or the subset of input pairs N, D where N=0. Similarly, in the fourth and fifth examples sets of base and range reduction properties where the range reduction relationship is N'=N+1 every positive numerator can be reached by continually adding 1 from (a) any N<D or (b) N=0, thus the base property can be configured to verify the subset of input pairs N, D where N<D or the subset of input pairs N, D where N=0. Conversely, in the third example set of base and range reduction properties where the range reduction relationship is N'=N+D every positive numerator cannot be reached by continually adding D from N=0 thus the base property cannot be configured to verify the subset of input pairs N, D where N=0. However, every positive numerator can be reached by continually adding D to N<D thus the base property can be configured to verify the subset of input pairs N, D where N<D.

Example Set of Largest Negative Numerator Properties

As described above, the largest negative numerator properties are designed to verify that the integrated circuit hardware design to implement integer division correctly processes input pairs N, D where the numerator N has the largest negative possible representable value (e.g. N=−$2^{k+1}$ in the example of FIG. 4).

The largest negative numerator properties may include properties based on the same range reduction relationship(s) used in the one or more range reduction properties (e.g. N'=2N or 2N+1; =N+D; =N+1) to relate input pairs where the numerator is the largest possible negative number to input pairs where the numerator is the next largest possible negative number that satisfies the range reduction relationship.

For example, where the one or more range reduction properties are based on the range reduction relationships N'=2N and N'=2N+1, the one or more largest negative numerator properties may include:

If N=−$2^k$ and N'=2N=−$2^{(k+1)}$ and 2r<D then:
q'=2q
r'=2r

If N=−$2^k$ and N'=2N=−$2^{(k+1)}$ and 2r≥D then:
q'=2q+1
r'=2r−D

Where the one or more range reduction properties are based on the range reduction relationship N'=N+D the one more largest negative numerator properties may include:

If $N=-2^k+D$ and $N'=2N=-2^{(k+1)}$ then:
q'=q+1
r'=r.

Where the one or more range reduction properties are based on the range reduction relationship $N'=N+1$ the one more largest negative numerator properties may include:
If $N=-2^k+1$ and $N'=2N=-2^{(k+1)}$ then:
q'=q+1
r'=r.

It will be evident to a person of skill in the art that these are examples only and that other sets of largest negative numerator properties may be used to verify that an instantiation of the integrated circuit hardware design will correctly process input pairs where the numerator is the largest possible negative numerator.

Example Set of Largest Negative Denominator Properties

As described above, the largest negative denominator properties are designed to verify that the integrated circuit hardware design to implement integer division correctly processes input pairs N, D where the denominator D has the largest possible negative representable value (e.g. $D=-2^{k+1}$ in the example of FIG. 4).

When the denominator D is the largest negative number q=0 and r=N unless N=D which will produce q=1 and r=0. Accordingly the largest negative denominator properties may be configured to verify that the instantiation of the integrated circuit hardware design correctly processes input pairs N, D where D is the largest negative denominator by verifying that q=0 and r=N when $N=-2^{k+1}$ and N<D; and q=0 and r=N when $N=D=-2^{k+1}$ where k is the number of bits for the denominator D.

Figure 7:
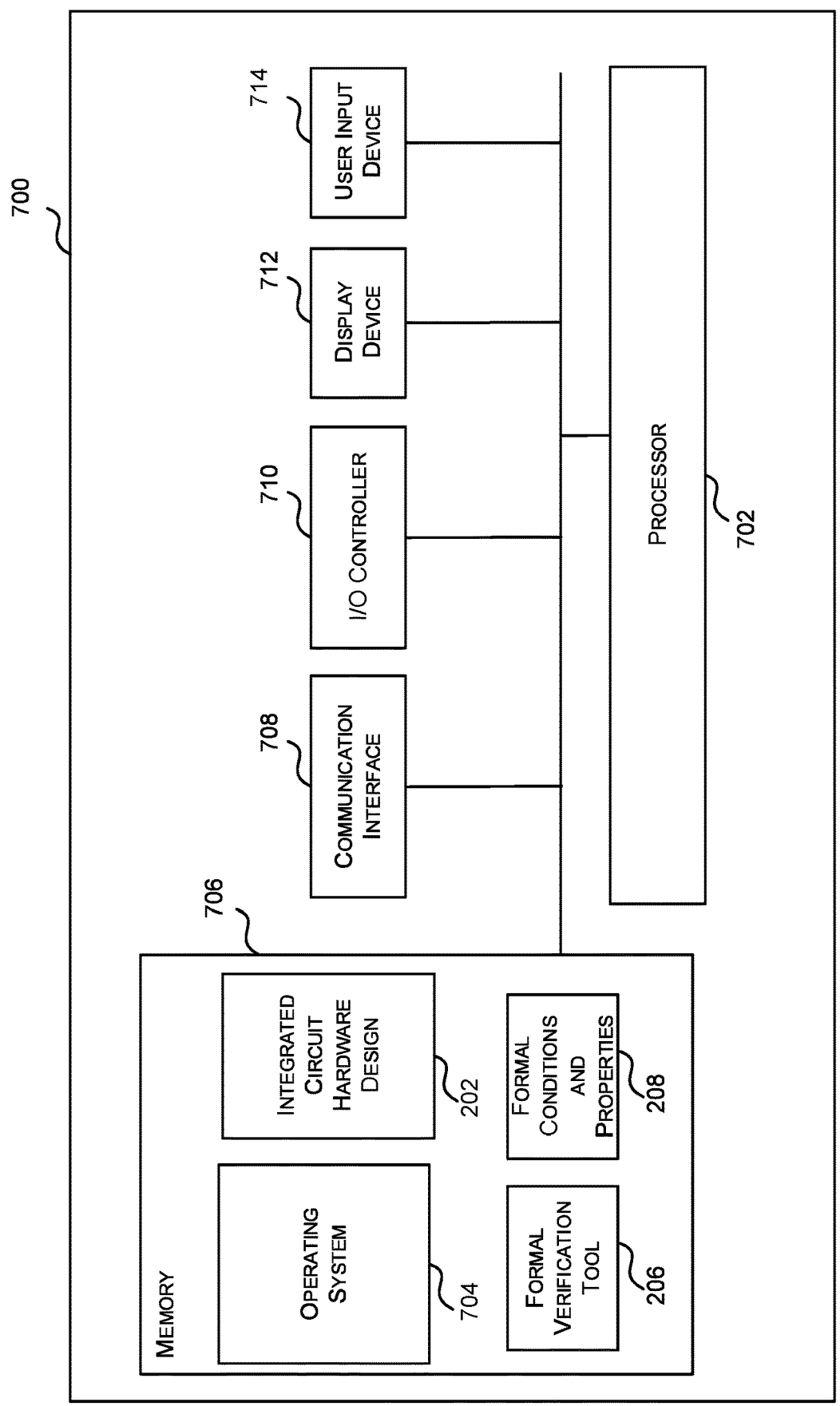
FIG. 7 is a block diagram of an example computing-based system.

FIG. 7 illustrates various components of an exemplary computing-based device 700 which may be implemented as any form of a computing and/or electronic device, and in which embodiments of the methods and systems described herein may be implemented.

Computing-based device 700 comprises one or more processors 702 which may be microprocessors, controllers or any other suitable type of processors for processing computer executable instructions to control the operation of the device in order to verify an integrated circuit hardware design to implement integer division. In some examples, for example where a system on a chip architecture is used, the processors 702 may include one or more fixed function blocks (also referred to as accelerators) which implement a part of the method of verifying an integrated circuit hardware design to implement integer division in hardware (rather than software or firmware). Platform software comprising an operating system 704 or any other suitable platform software may be provided at the computing-based device to enable application software, such as a formal verification tool 206, to be executed on the device.

The computer executable instructions may be provided using any computer-readable media that is accessible by computing based device 700. Computer-readable media may include, for example, computer storage media such as memory 706 and communications media. Computer storage media (i.e. non-transitory machine readable media), such as memory 706, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 706) is shown within the computing-based device 700 it will be appreciated that the storage may be distributed or located remotely and accessed via a network or other communication link (e.g. using communication interface 708).

The computing-based device 700 also comprises an input/output controller 710 arranged to output display information to a display device 712 which may be separate from or integral to the computing-based device 700. The display information may provide a graphical user interface. The input/output controller 710 is also arranged to receive and process input from one or more devices, such as a user input device 714 (e.g. a mouse or a keyboard). This user input may be used to initiate verification of the integrated circuit hardware design to implement integer division. In an embodiment the display device 712 may also act as the user input device 714 if it is a touch sensitive display device. The input/output controller 710 may also output data to devices other than the display device, e.g. a locally connected printing device (not shown in FIG. 7).

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

There may be provided a method of manufacturing, at an integrated circuit manufacturing system, an integrated circuit to implement integer division as described herein. Furthermore, there may be provided an integrated circuit definition dataset that, when processed in an integrated circuit manufacturing system, causes the method of manufacturing an integrated circuit to implement integer division to be performed.

An integrated circuit definition dataset (e.g. an integrated circuit hardware design) may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an integrated circuit to implement integer division will now be described with respect to FIG. 8.

Figure 8:
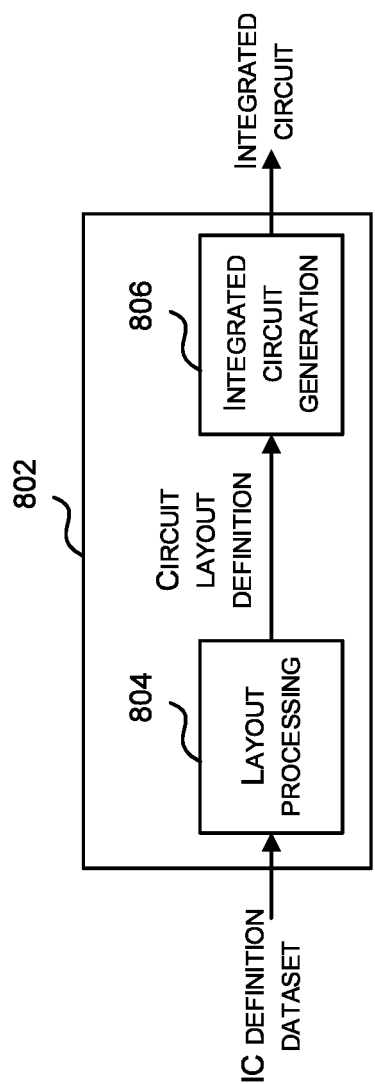
FIG. 8 is a block diagram of an example integrated circuit manufacturing system for generating an integrated circuit to implement integer division.

FIG. 8 shows an example of an integrated circuit (IC) manufacturing system 802 which is configured to manufacture an integrated circuit to implement integer division. In particular, the IC manufacturing system 802 comprises a layout processing system 804 and an integrated circuit generation system 806. The IC manufacturing system 802 is configured to receive an IC definition dataset (e.g. an integrated circuit hardware design to implement integer division as described herein), process the IC definition dataset, and generate an IC according to the IC definition dataset (e.g. which embodies an integer divider). The processing of the IC definition dataset configures the IC manufacturing system 802 to manufacture an integrated circuit implementing integer division as described in any of the examples herein.

The layout processing system 804 is configured to receive and process the IC definition dataset (e.g. integrated circuit hardware design) to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an integrated circuit to implement integer division without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A computer-implemented method of verifying an integrated circuit hardware design to implement an integer divider, the integer divider configured to receive a numerator N and a denominator D and output a quotient q and a remainder r, the method comprising, in one or more processors:

verifying a base property of the integrated circuit hardware design, wherein verifying the base property verifies that an instantiation of the integrated circuit hardware design will generate a correct output pair q, r in response to any input pair N, D in a subset of non-negative input pairs;

formally verifying, by a formal verification tool, one or more range reduction properties of the integrated circuit hardware design, wherein verifying the one or more range reduction properties verifies that if an instantiation of the integrated circuit hardware design will generate an output pair q, r in response to a non-negative input pair N, D then an instantiation of the integrated circuit hardware design will generate an output pair q', r' that has a predetermined relationship with q and r in response to another non-negative input pair N', D where N and N' have one of one or more predetermined relationships; and outputting one or more signals indicating whether the properties have been successfully verified.

2. The method of claim 1, further comprising, in response to the one or more signals indicating that at least one property was not successfully verified, modifying the integrated circuit hardware design.

3. The method of claim 1, further comprising, in response to the one or more signals indicating that the properties were successfully verified, manufacturing, at an integrated circuit manufacturing system, an integrated circuit according to the integrated circuit hardware design.

4. The method of claim 1, wherein the one or more predetermined relationships between N and N' comprises N'=N+D.

5. The method of claim 1, wherein the one or more predetermined relationships between N and N' comprises N'=N+1.

6. The method of claim 1, wherein the one or more predetermined relationships between N and N' comprises $N'=2^zN, 2^zN+1, 2^zN+2, \ldots 2^zN+(2^z-1)$, wherein z is an integer.

7. The method of claim 6, wherein z is equal to one.

8. The method of claim 7, wherein the one or more range reduction properties comprises:
if N'=2N and 2r<D then r'=2r and q'=2q;
if N'=2N and 2r≥D then r'=2r−D and q'=2q+1;
if N'=2N+1 and 2r<D then r'=2r+1 and q'=2q; and
if N'=2N+1 and 2r≥D then r'=2r+1−D and q'=2q+1.

9. The method of claim 1, wherein the one or more predetermined relationships between N and N' comprises $N'=\alpha N, \alpha N+1, \alpha N+2, \ldots \alpha N+(\alpha-1)$, wherein $\alpha$ is an integer.

10. The method of claim 6, wherein the subset of non-negative input pairs comprises non-negative input pairs N, D where N=0.

11. The method of claim 10, wherein the base property is that in response to any input pair in the subset of non-negative input pairs each output pair q, r satisfies q=0 and r=0.

12. The method of claim 1, wherein the subset of non-negative input pairs comprises non-negative input pairs N, D where N<D.

13. The method of claim 12, wherein the base property is that in response to any input pair in the subset of non-negative input pairs each output pair q, r satisfies q=0 and r=N.

14. The method of claim 1, further comprising verifying one or more sign relation properties of the integrated circuit hardware design, wherein verifying the one or more sign relation properties verifies that if an instantiation of the integrated circuit hardware design produces an output pair q, r in response to a non-negative input pair N, D that an instantiation of the integrated circuit hardware design will produce an output pair q', r' that has a predetermined relationship with q, r in response to another input pair N', D' where N'=−N and/or D'=−D.

15. The method of claim 14, wherein the one or more sign relation properties comprises:
if N'=N and D'=−D, then q'=−q and r'=r;
if N'=−N and D'=D, then q'=−q and r'=−r; and
if N'=−N and D'=−D, then q'=q and r'=−r.

16. The method of claim 14, wherein the numerator N is represented in two's-complement format, and the method further comprises verifying one or more largest negative numerator properties of the integrated circuit hardware design, wherein verifying the one or more largest negative numerator properties verifies that in response to any input pair N, D wherein N is the largest negative numerator representable in the two-complement format an instantiation of the integrated circuit hardware design will generate a correct output pair q, r.

17. The method of claim 14, wherein the denominator D is represented in two's-complement format, and the method further comprises verifying one or more largest negative denominator properties of the integrated circuit hardware design, wherein verifying the one or more largest negative denominator properties verifies that in response to any input pair N, D wherein D is the largest negative denominator representable in the two-complement format an instantiation of the integrated circuit hardware design to implement the integer divider will generate a correct output pair q, r.

18. The method of claim 1, wherein processing the integrated circuit hardware design at an integrated circuit manufacturing system causes the integrated circuit manufacturing system to manufacture an integrated circuit that implements an integer divider.

19. A system to verify an integrated circuit hardware design to implement an integer divider, the integer divider configured to receive a numerator N and a denominator D and output a quotient q and a remainder r, the system comprising:
one or more processors; and
memory, comprising:
a formal verification tool;
computer-readable instructions that when executed by the one or more processors cause the one or more processors to:
verify a base property of the integrated circuit hardware design, wherein verifying the base property verifies that an instantiation of the integrated circuit hardware design will generate a correct output pair q, r in response to any input pair N, D in a subset of non-negative input pairs;
formally verify, by the formal verification tool, one or more range reduction properties of the integrated circuit hardware design, wherein verifying the one or more range reduction properties verifies that if an instantiation of the integrated circuit hardware design will generate an output pair q, r in response to a non-negative input pair N, D then an instantiation of the integrated circuit hardware design will generate an output pair q', r' that has a predetermined relationship with q and r in response to another non-negative input pair N', D where N and N' have one of one or more predetermined relationships; and
output one or more signals indicating whether the properties have been successfully verified.

20. A non-transitory computer readable storage medium having stored thereon computer readable instructions that, when executed at a computer system, cause the computer system to:
verify a base property of an integrated circuit hardware design to implement an integer divider, the integer divider configured to receive a numerator N and a denominator D and output a quotient q and a remainder r, wherein verifying the base property verifies that an instantiation of the integrated circuit hardware design will generate a correct output pair q, r in response to any input pair N, D in a subset of non-negative input pairs;

formally verify, by a formal verification tool, one or more range reduction properties of the integrated circuit hardware design, wherein verifying the one or more range reduction properties verifies that if an instantiation of the integrated circuit hardware design will generate an output pair q, r in response to a non-negative input pair N, D then an instantiation of the integrated circuit hardware design will generate an output pair q', r' that has a predetermined relationship with q and r in response to another non-negative input pair N', D where N and N' have one of one or more predetermined relationships; and output one or more signals indicating whether the properties have been successfully verified.

* * * * *